(12) United States Patent
Funamoto et al.

(10) Patent No.: US 6,247,826 B1
(45) Date of Patent: *Jun. 19, 2001

(54) ILLUMINATION DEVICE AND BULLETIN BOARD DEVICE

(75) Inventors: Tatsuaki Funamoto; Osamu Yokoyama, both of Shiojiri (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/110,319

(22) Filed: Jul. 6, 1998

(30) Foreign Application Priority Data

Jul. 7, 1997 (JP) .................................................. 9-181111
Jun. 4, 1998 (JP) ................................................ 10-155863

(51) Int. Cl.$^7$ ...................................................... F21V 7/04
(52) U.S. Cl. ................................ 362/31; 362/26; 362/27; 349/63; 349/65
(58) Field of Search .................................. 362/26, 27, 31; 349/58, 63, 64, 65, 70

(56) References Cited

U.S. PATENT DOCUMENTS

| | | | |
|---|---|---|---|
| 2,071,777 | * | 2/1937 | Bloem ........................ 362/31 |
| 2,646,637 | * | 7/1953 | Neirenberg et al. ............ 362/31 |
| 4,697,365 | * | 10/1987 | Mossbrugger et al. .......... 40/546 |
| 4,779,166 | * | 10/1988 | Tanaka et al. ................ 362/31 |
| 5,153,590 | * | 10/1992 | Charlier ..................... 341/31 |
| 5,341,231 | | 8/1994 | Yamamoto et al. . |
| 5,394,255 | * | 2/1995 | Yokota et al. ................ 359/49 |
| 5,396,406 | * | 3/1995 | Ketchpel .................... 362/27 |
| 5,477,423 | * | 12/1995 | Fredriksz et al. ............ 362/21 |
| 5,815,225 | * | 9/1998 | Nelson ...................... 349/665 |

FOREIGN PATENT DOCUMENTS 6-324331    11/1994    (JP) .

* cited by examiner

Primary Examiner—Stephen Husar
Assistant Examiner—John Anthony Ward
(74) Attorney, Agent, or Firm—Oliff & Berridge, PLC (57) ABSTRACT

A curved surface is provided under a range of conditions whereby light rays from a light source that are input from an end face of a light guide plate are guided within light guide plate. When light rays reach projecting shapes that are provided on plate face of light guide plate, they are output from light guide plate and illuminate object to be illuminated. With this construction, light guide plate has the function of transmitting with scarcely any dispersion rays of light that are directed on to object to be illuminated and that are reflected by object to be illuminated.

28 Claims, 12 Drawing Sheets

ILLUMINATION DEVICE AND BULLETIN BOARD DEVICE

BACKGROUND OF THE INVENTION

1. Field of the Invention

The present invention relates to a thin sheet-form illumination device for illuminating objects to be illuminated such as images printed on paper, liquid crystal displays, or solid objects, and to a bulletin board device or the like employing an illumination device according to the present invention.

2. Description of the Related Art

As in Early Japanese Patent Publication No. H.6-324331, in a conventional sheet illumination device arranged at the front face of for example a liquid crystal display, the light-guide plate constituting the illumination device consists in a flat plate of high rigidity.

However, since in the conventional sheet illumination devices, the light guide plate was a flat plate of high rigidity, and as the conventional liquid crystal display devices etc. using flat rigid bodies made of for example glass were mostly employed for illumination of planar articles of high rigidity, when they were employed for illumination of objects having curved surfaces or flexibility, irregular spaces were produced between the illumination device and the illuminated object, making uniform illumination difficult to achieve and impairing flexibility of the illuminated object: thus they were sometimes unsuitable for their purpose.

SUMMARY OF THE INVENTION

An object of the present invention is to solve such problems and provide an illumination device wherein the degrees of freedom of shape of the object to be illuminated are not reduced and whose adaptability in terms of design is high, and to a bulletin board device employing this illumination device, by making the light guide plate a curved surface or by conferring flexibility on the light guide plate.

In order to solve the aforementioned problem an illumination device according to the present invention.

(1) in an illumination device arranged at the front face of an object to be illuminated, comprises: a light guide plate which has optical diffusion shapes on at least one plate face of a transparent plate having a curved surface: and a light source arranged adjacent an end face of this light guide plate.

(2) In a cross-section produced by a plane containing part of said light source of said light guide plate, said light guide plate having an approximately fixed thickness of t, if θ is the angle with respect to the tangential plane of this plate surface of said light guide plate at said end face of incident light from said end face adjacent which said light source is arranged, n1 is the refractive index of said light guide plate, n2 is the refractive Index of the medium contacting this plate face of said light guide plate, and r is the radius of curvature on the side of said light guide plate of smallest plate face, the condition:

$$t/r \leq (n1/n2) \times \cos\theta - 1$$

is satisfied.

(3) The end face at which at least said light source is arranged adjacently is approximately perpendicular with respect to the tangential plane of the plate face of said light guide plate, said light guide plate has an approximately fixed thickness of t, and, in a cross-section based on the plane containing part of said light source of said light guide plate, if the refractive index of said light guide plate is n1, the refractive index of the medium containing the plate face of said light guide plate is n2, and the refractive index of the medium contacting said end face where the light source of said light guide plate is arranged is n3 and the radius of curvature of the smaller plate face of said light guide plate is r, the condition $$t/r \leq (n1^2 - n3^2)^{1/2}/n2 - 1$$

is satisfied.

(4) An illumination device arranged at the front face of an object to be illuminated comprises; a light guide plate formed with optical diffusion shapes on at least one plate face of a transparent plate formed of flexible transparent material; and a light source arranged adjacent an end face of this light guide plate.

(5) A transparent film is arranged adjacent at least one plate face of said light guide plate, with interposition of an air layer.

(6) Said optical diffusion shapes are projecting shapes provided on the side of said light guide plate nearest the object to be illuminated.

(7) Said projecting shapes are constituted of side faces approximately perpendicular with respect to the tangential plane of the plate face of said light guide plate and bottom faces approximately parallel thereto.

(8) Said projecting shapes are cylindrical pillar shapes.

(9) Said optical diffusion shapes are convex shapes provided on the face of said light guide plate on the opposite side with respect to the object to be illuminated.

(10) Said optical diffusion shapes are concave shapes provided on the face of said light guide plate on the opposite side with respect to the object to be illuminated. Also a bulletin board device according to the present invention employs an illumination device according to the present invention.

Also a timepiece according to the present invention employs an illumination device according to the present invention.

Also a portable illumination device according to the present invention employs an illumination device according to the present invention.

Also a display device according to the present invention employs an illumination device according to the present invention.

Also electronic equipment according to the present invention employs a display device according to the present invention.

Also a mobile telephone device according to the present invention employs a display device according to the present invention.

DESCRIPTION OF THE PREFERRED EMBODIMENTS (First Embodiment)

Figure 1:
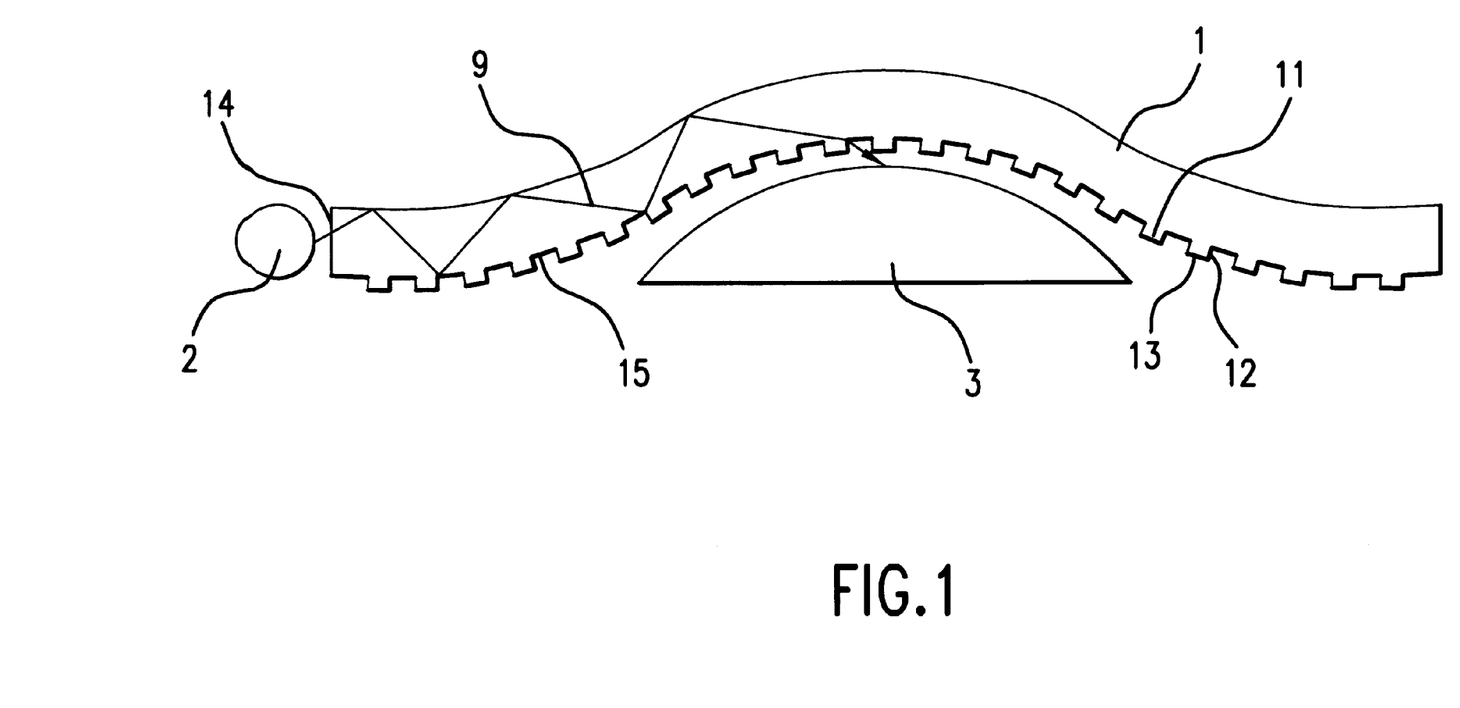
FIG. 1 is a cross-sectional view showing an embodiment of an illumination device according to the present invention.

An embodiment of the present invention is described below with reference to the drawings. In FIG. 1, light guide plate 1 is a transparent plate having a practically constant thickness and having a curved surface in accordance with its purpose. A light source 2 is arranged adjacent the end face 14 of light guide plate 1, and rays of light from light source 2 are directed into light guide plate 1 from end face 14. On one of the plate faces 15 of light guide plate 1, there are provided projecting shapes 11 constituted by side faces 12 that are practically perpendicular and bottom faces 13 that are practically parallel to the tangential plane direction of the curved surface of light guide plate 1. As shown by light ray 9, when optical flux from light source 2 is incident from the end face 14, it undergoes repeated reflection within light guide plate 1. When, during this process, it reaches the side face 12 of a projecting shape 11, since most of the light rays arrive at side face 12 of projecting shape 11 at more than the critical angle, this optical flux can be output from light guide plate 1. There is therefore a large optical output from the rear face of the illumination device, enabling object 3 which is to be illuminated to be illuminated in an effective manner.

Figure 2A:
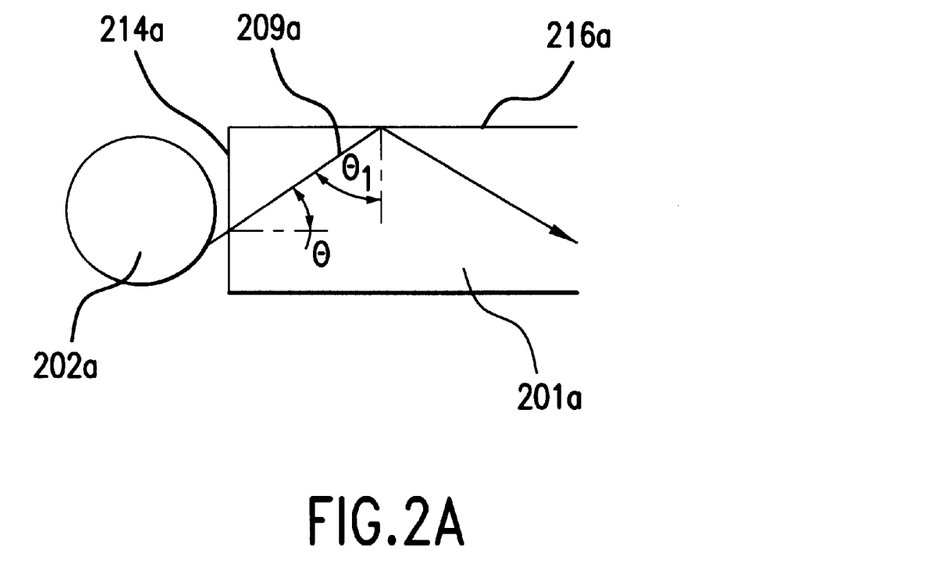
FIGS. 2A and 2B are a diagram illustrating the principles in an embodiment of an illumination device according to the present invention.

FIG. 2A shows an optical path when light guide plate 201a is planar. End face 214a is practically perpendicular with respect to plate face 216a of light guide plate 201a. If the refractive index of light guide plate 201a is n1 and the refractive index of the medium contacting the end face 214a is n3, the angle θ of a light ray 209a that is incident from light source 202 satisfies the condition:

$$n1 \times \sin \theta \leq n3$$

Figure 2B:
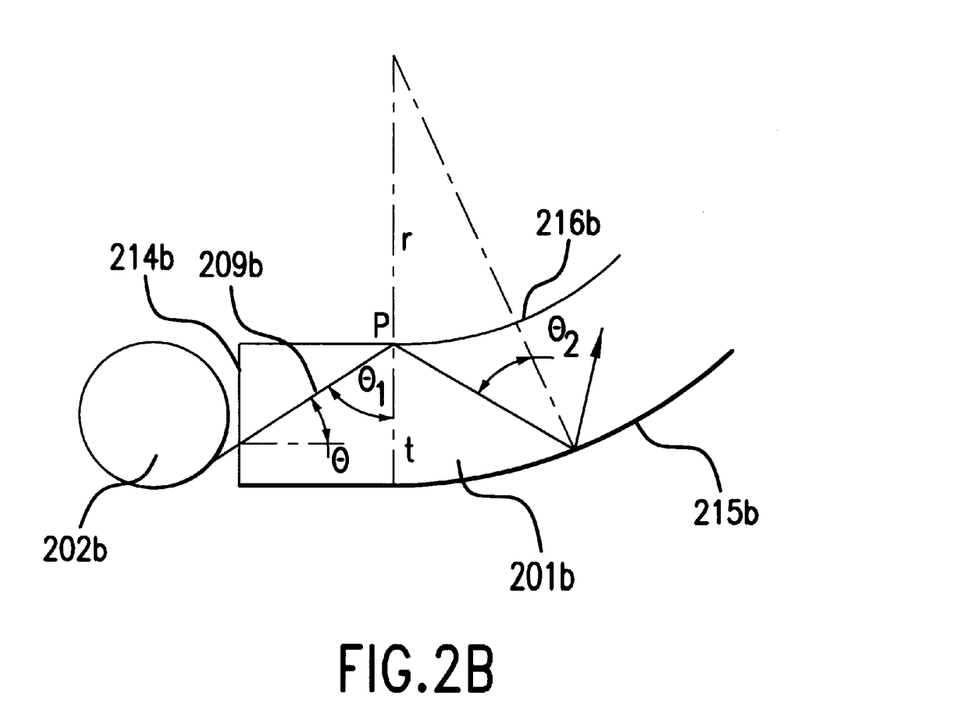

Furthermore, if the refractive index of the medium contacting plate face 216a of light guide plate 201a is n2, the angle of ray 209a that is input from plate face 216a is θ1, and the end face 214a is perpendicular with respect to plate face 216a. if $$n1 \times \sin \theta1 \geq n2$$

ray 209a is totally reflected. Specifically, if $$n1^2 \geq n2^2 + n3^2$$

the incident light from the end face can be totally reflected by the plate face. FIG. 2B shows the case where light guide plate 201b has a curved surface. From end face 214b to point P is a flat plate; the angles θ, θ1 of the incident light from end face 214b and the reflected light at plate face 216b are the same as in the case of FIG. 2A. As shown, after point P. the surface is a curved surface having an arc of radius r. Accordingly, if the angle θ2 of the incident light on to plate face 215b on the opposite side satisfies $$n1 \times \sin \theta2 \geq n2$$

ray 209b can be guided by total reflection.

If the thickness of the light guide plate is t and the radius of curvature if taken to be r, from FIG. 2B $$(\sin \theta2)/r = \{\sin(90° + \theta)\}/(r+t)$$

and if θ2 is the critical angle, if $$t/r \leq (n1/n2) \times \cos \theta - 1$$

rays can be guided by total reflection within light guide plate 201b.

Also, if input end face 214b is perpendicular with respect to the plate face, since the angle of incidence θ is determined by refractive indices n1, n2, if $$t/r \leq (n1 - n3^2)^{1/2}/n2 - 1$$

it can be seen that rays can be guided through light guide plate 201b by total reflection. From the above, in FIG. 1, if the medium contacting the faces of light guide 1 is air, if the refractive index of light guide 1 is 1.4 or more, incoming light from end face 14 is totally reflected at end face 15. As the material of light guide plate 1, transparent resin such as acrylic resin, polycarbonate resin, or amorphous polyolefin resin, or inorganic transparent material such as glass, or composites thereof, may be employed. If for example acrylic resin of refractive index 1.492 is employed, in the case of a light guide plate of thickness 1 mm, the curvature of the curved face may take values down to a minimum of about 9.3 mm. If a collimator is introduced that restricts the upper limit of the incidence angle θ at the end face, the radius of curvature may be further reduced.

Since the projections provided on light guide plate 1 have a shape provided with side faces 12 that are approximately perpendicular to the tangential plane of plate face 15, as described above, light rays that are guided thereto can be output from light guide plate 1 when they arrive at these side faces 12. Although the shape can be freely chosen so long as there are faces approximately perpendicular and faces approximately parallel to the tangential plane of plate face 15 of light guide plate 1, a cylindrical pillar face or shape based thereon is preferable. since it has no anisotropy of direction, so light can enter simultaneously from all directions of the light guide plate when for example a point light source is employed as the light source.

For the formation of projecting shapes 11 on the transparent plate of light guide plate 1, various methods may be adopted, such as injection moulding, thermosetting resin, photosetting resin, etching, or joining a layer of resin or film on to transparent resin or a glass plate. Also, apart from performing curved surface processing before or after formation of the projecting shapes, in the case of injection moulding etc., the curved face could be produced simultaneously.

As light source 2, a fluorescent tube, an electric light bulb, or light-emitting diode (LED) etc. could be employed. Fluorescent tubes have the characteristic advantages that high brightness can be expected at low power and white light can easily be obtained. LEDs have a semi-permanent life and their circuitry is simple since they can be driven at low voltage. Furthermore, they are of high safety in regard to risks of catching fire and electric shock. Regarding colour, recently, mixed colours and white have also become available apart from red, green and blue, so a wide choice is available, depending on application. If electric light bulbs are employed, there is the drawback that their life is short, but they are cheap and can easily be replaced.

Since the wavelength of visible light is about 380 nm to 700 nm, in order to avoid the production of effects due to diffraction, the size of projecting shapes 11 must be made at least about 5 µm and in order that they should not be so large as to be bulletinable to the naked eye, projecting shapes 11 should be desirably less than about 300 µm. In addition to the above, from the point of view of convenience in manufacture, the size of projecting shapes 11 should desirably be above about 10 µm and below 100 µm.

When this illumination device is arranged at the front face of an object 3 to be illuminated, in accordance with the above construction, part-time illumination can be achieved whereby, when there is sufficient external light i.e. in brightly-lit conditions, object 3 to be illuminated can be observed with the illumination extinguished, whereas when external light is insufficient i.e. under dark conditions, object 3 to be illuminated can be observed with the Illumination switched on.

Suitable examples of objects 3 to be illuminated by the illumination device as above include printed matter printed on paper etc. or a liquid crystal display etc.

Figure 3:
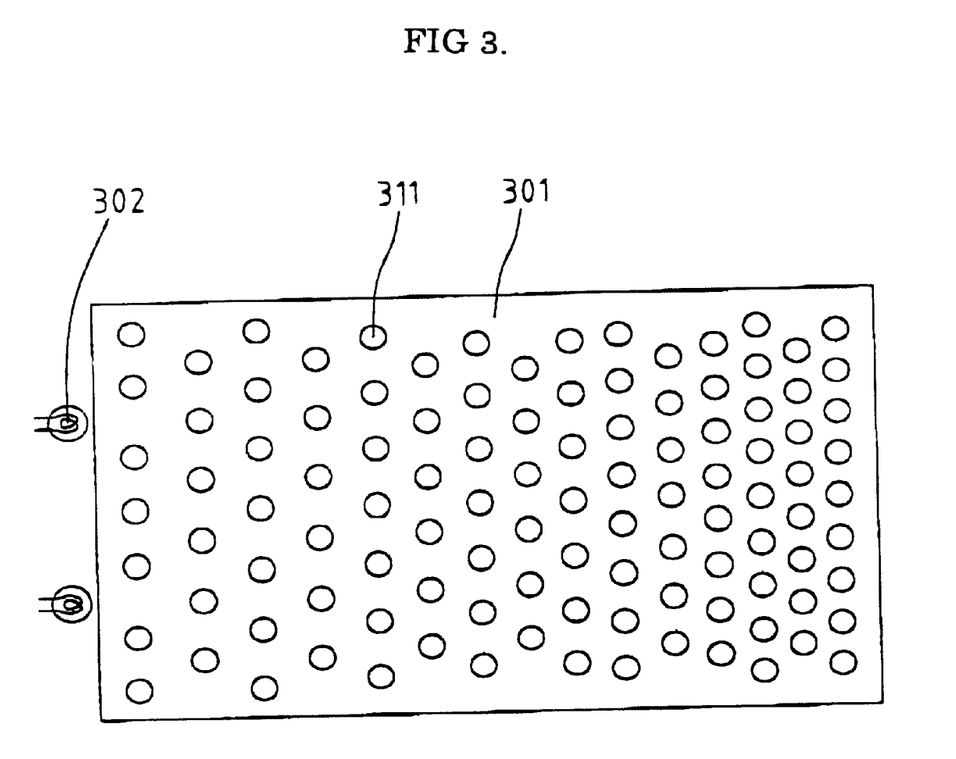
FIG. 3 is a diagram relating to the distribution of arrangement of optical diffusion shapes in another embodiment of an illumination device according to the present invention.

In FIG. 3, an example is shown in which the density of projecting shapes 311 as described above is more sparse in the vicinity of light source 302 and is more densely distributed as the separation from light source 302 increases. Although the optical flux density in light guide plate 301 is high in the vicinity of light source 302, the rays are diffused by projecting shapes 311, so the optical flux density decreases as distance from light source 302 increases: the projecting shapes 311 are therefore arranged with progressively increasing density. More uniform illumination can thereby be achieved. Although light source 302 is in this case a point light source, the same would apply for the case of a linear light source such as a fluorescent tube.

Figure 4:
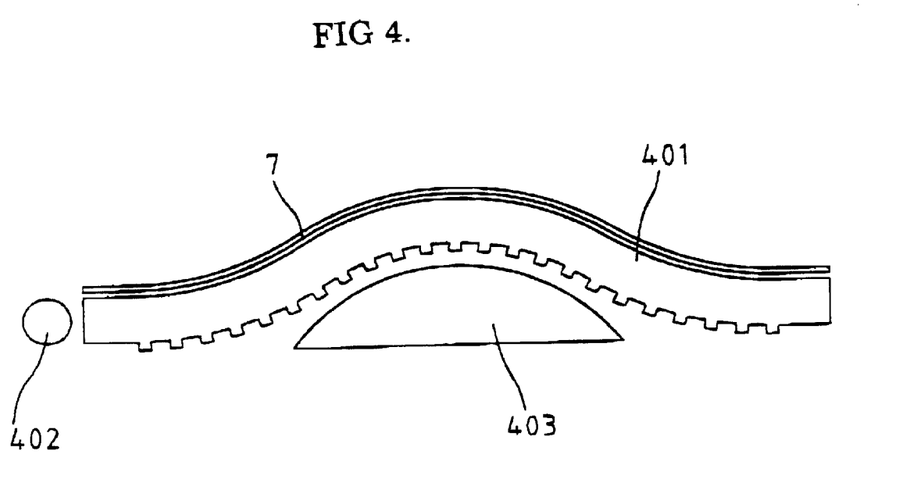
FIG. 4 is a cross-sectional view showing another embodiment of an illumination device according to the present invention.

In FIG. 4, a transparent plate or transparent sheet 7 is arranged on the observer's side of light guide plate 401. Light guide plate 401 and the transparent plate or transparent sheet 7 are not stuck together, and a layer of low refractive index, such as an air layer, is present therebetween. If even slight scratches are present In the surface of the light guide plate 401, the rays that are being guided through its interior are reflected thereat, and these can be recognised as bright points or bright lines from the front face. Not only are these unpleasant to view under transmitted illumination but they severely lower recognisability, due to a loss of contrast. Since transparent plate or transparent sheet 7 has a layer of low refractive index, such as an air layer, interposed between itself and light guide plate 401, optical flux from light source 402 cannot enter, so even if scratches are present, they cannot cause bright points or bright lines.

Also, since the relative area of the scratches is slight, they have very little influence on recognisability of illuminated object 403. In order for this light guide plate 401 to be employed as front-arranged illumination, the presence of such a transparent plate or transparent sheet 7 is indispensable. As the transparent plate or transparent sheet 7, transparent resin such as acrylic resin, polycarbonate resin, or amorphous polyolefin resin, or inorganic transparent material such as glass may be employed. Also, when used incorporated in an actual device or the like, transparent plate or transparent sheet 7 may be employed in combination with an externally mounted glass member.

(Second Embodiment)

Figure 5A:
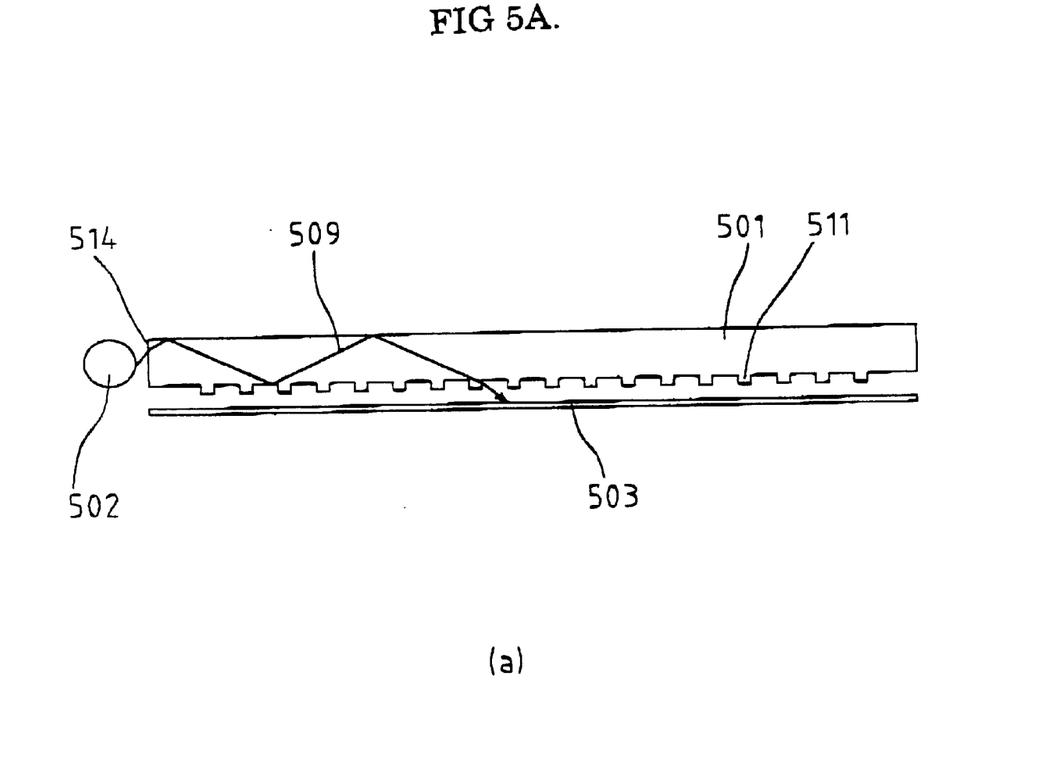
FIGS. 5A and 5B are a cross-sectional view showing another embodiment of an illumination device according to the present invention.
Figure 5B:
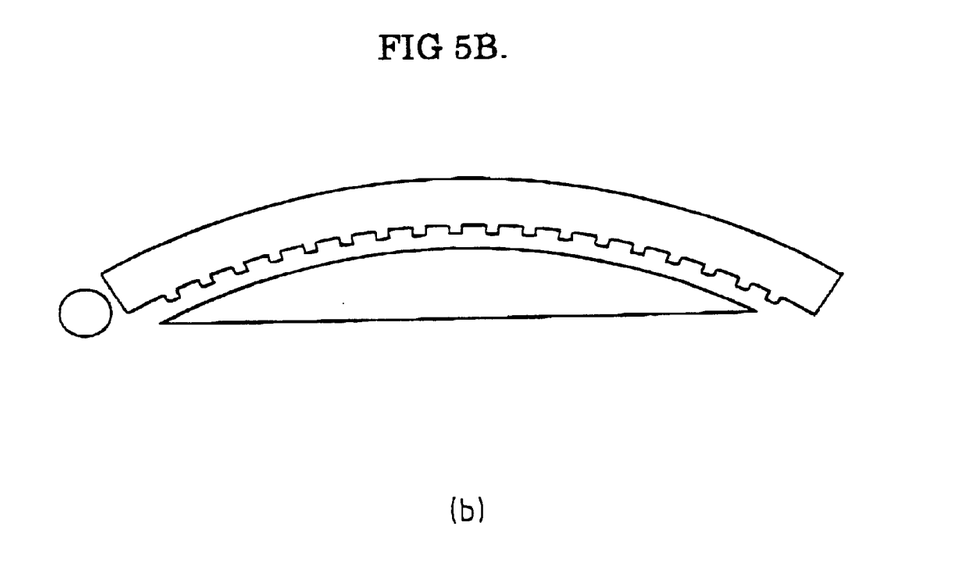

A further embodiment of the present invention is described below with reference to the drawings. In FIG. 5A, light guide plate 501 Is formed by a transparent body having flexibility and provided with projecting shapes. A light source 502 is arranged adjacent to end face 514 of light guide plate 501, and rays 509 from light source 502 are directed into light guide plate 501 from end face 514. As described above, rays 509 that are input to light guide plate 1 undergo repeated reflection within light guide plate 501 and are output from light guide plate 501 when they reach projecting shapes 511. Since light guide plate 501 is flexible, it can deform as shown in FIG. 5B in accordance with the shape of object 503 to be illuminated. Even if light guide plate 501 is deformed, if the amount of the deformation is not too large, it will have an approximately fixed thickness, and, if the aforementioned $$t/r \leq (n1/n2) \times \cos\theta - 1$$

(where t is the thickness, r is the radius of curvature, n1 is the refractive index of light guide plate 501, n2 is the refractive index of the medium that contacts the plate face of light guide plate 501, and θ is the angle of the incident light with respect to the plate face at end face 514) holds, the incident light cannot leak from the plate face.

Transparent resilient bodies such as silicone rubber, acrylic rubber, or urethane rubber are suitable as the material for forming light guide plate 501, but, if the radius of curvature is very small in relation to the thickness, transparent resins such as acrylic resin may also be employed.

(Third Embodiment)

Figure 6:
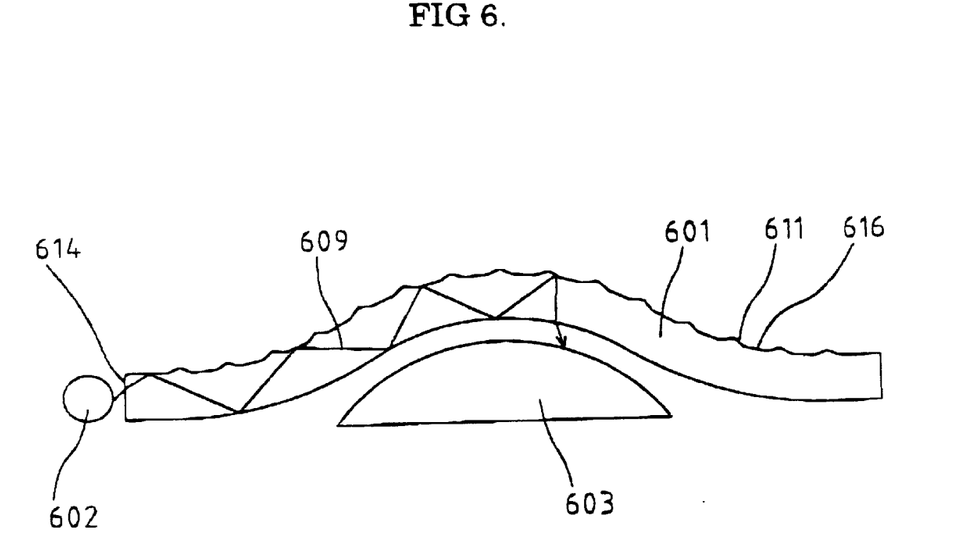
FIG. 6 is a cross-sectional view showing another embodiment of an illumination device according to the present invention.

A further embodiment of the present invention is described below with reference to the drawings. As shown in FIG. 6, light guide plate 1 is provided with convex shapes 611 on one face of the transparent plate. All of the faces of convex shapes 611 are constituted by faces of angle less than about 300 with respect to the tangential plane of plate face 616 of light guide plate 601. After the optical flux from light source 602 has been input from end face 614, as shown by ray 609, it undergoes repeated total reflection within light guide plate 601. When light rays eventually reach a convex shape 611, after they have been reflected by the faces of convex shapes 611, they make fairly large angles, exceeding the critical angle, with the plate face of light guide plate 601 and can therefore be output from light guide plate 601. As a result, there is considerable optical output from the back face of the illumination device, and object 603 to be illuminated can be effectively illuminated.

As described above, the shapes of the convex shapes can be freely selected so long as their faces make an angle of less than about 30° with respect to the tangential plane of the plate face 616 of light guide plate 601 but conical faces or shapes based thereon are advantageous in that their face angle is constant and they have no directional anisotropy of face direction.

These convex shapes 611 can be provided in an area ratio with respect to the area of the illuminating region that may be freely selected. However, although the efficiency of illumination can be raised by increasing the area ratio of convex shapes 611, this reduces the proportion of perpendicularly transmitted rays, thus lowering recognisability. In fact it is not practical to set the area ratio to a value exceeding 50%, and, for part-time illumination under dark conditions, it is suitable to set the area ratio to about 10%.

Also, if the density is regulated as described above in order to achieve uniform brightness of illumination, if the extent of this is about 10%. the area ratio of the perpendicular transmission region is in a range of about 80–90%, which means that unevenness of recognisability dependent on position is not perceived.

(Fourth Embodiment)

Figure 7:
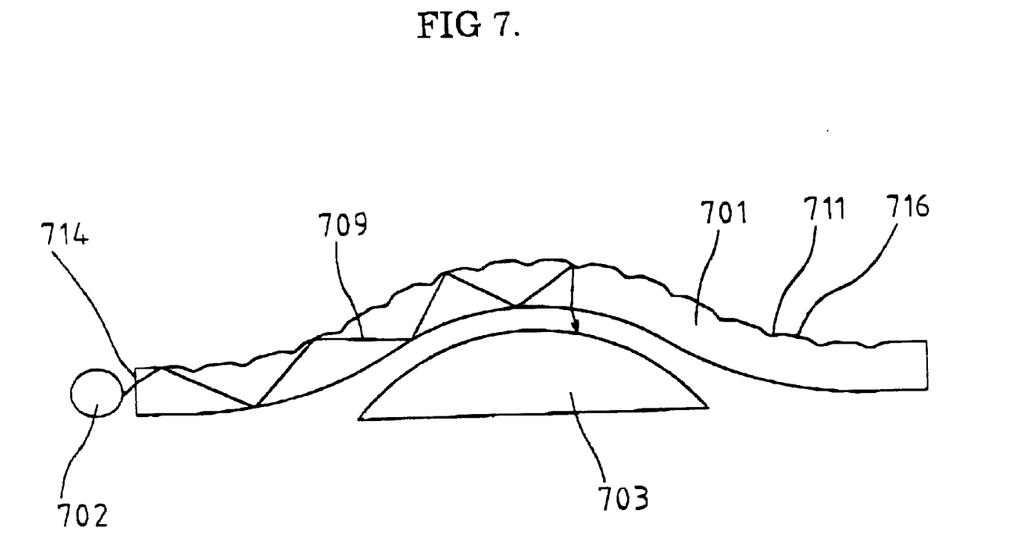
FIG. 7 is a cross-sectional view showing another embodiment of an illumination device according to the present invention.

A further embodiment of the present invention is described below with reference to the drawings. In FIG. 7, a light source 702 is arranged at the end of light guide plate 701. Concave shapes 711 are provided on one face of the transparent plate constituting light guide plate 701, the faces of concave shapes 711 being constituted by faces of angle less than about 30° with respect to the tangential plane of plate face 716 of light guide plate 711, in all cases. When optical flux from light source 702 is input from end face 714 as shown by light ray 709, it undergoes repeated total reflection within light guide plate 701. When these rays eventually reach a concave shape 711, they are reflected at the faces of concave shapes 711 and as a result make a fairly large angle, exceeding the critical angle, with the plate face of light guide plate 701 and so can be output from light guide plate 701. As a result, there is considerable optical output from the back face of the illumination device, enabling an object 703 to be illuminated in an effective manner.

As described above, the shape [of the concave shapes] can be freely selected so long as their faces make an angle of less than about 30° with respect to the tangential plane of plate face 716 of light guide plate 701, but conical faces or a shape based thereon are preferable since the angle of these faces can be made fixed and they have no directionality. The density and size of the concave shapes are the same as in the case of the projecting shapes described above and other details are also in accordance therewith.

Compared with the case described above where convex shapes were formed, the provision of concave shapes in the light guide plate as in the present invention has the advantage that these shapes do not affect the thickness.

(Fifth Embodiment)

Figure 8:
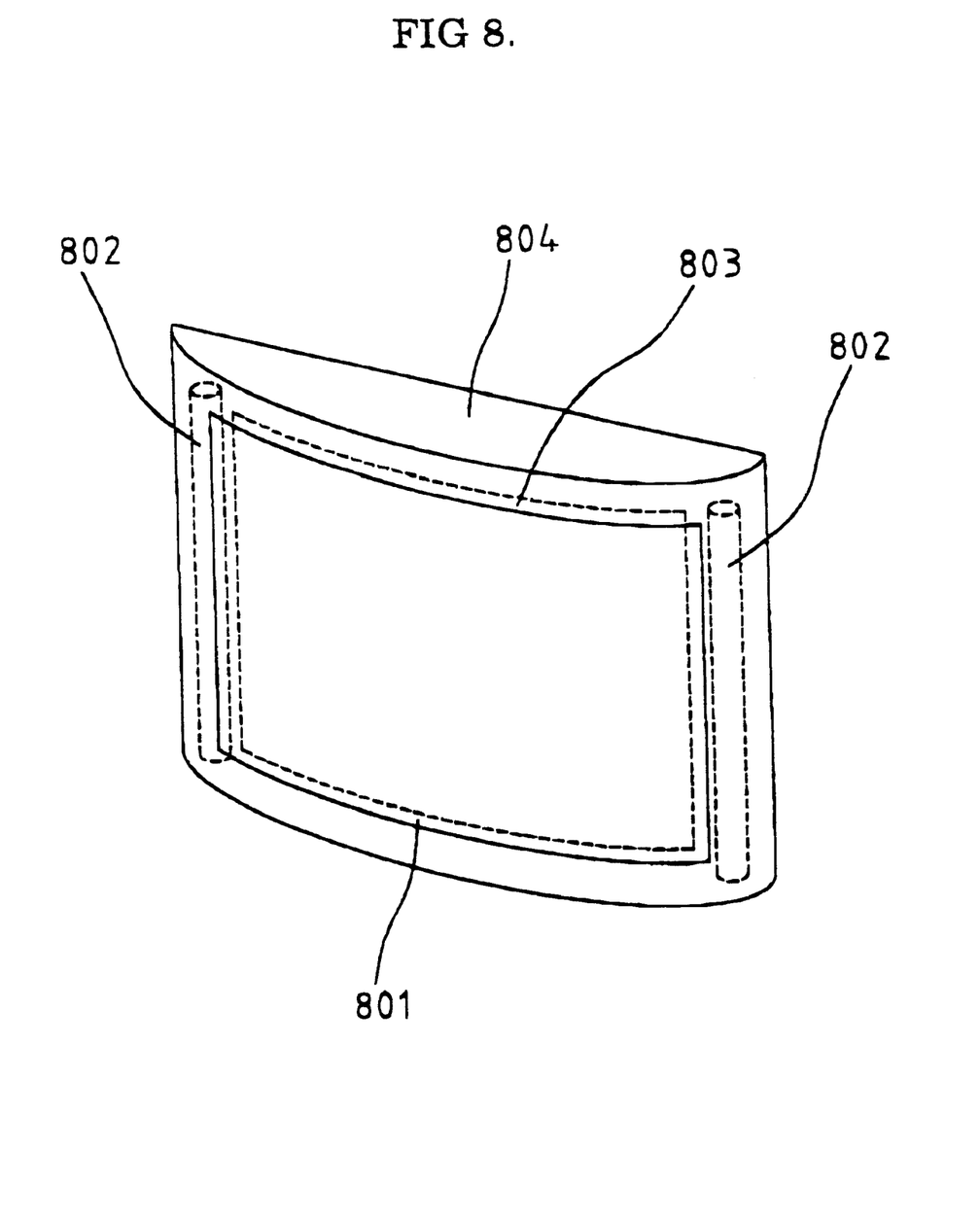
FIG. 8 is a perspective view showing an embodiment of a bulletin board device according to the present invention.

An embodiment of a bulletin board device according to the present invention will now be described with reference to the drawings. In FIG. 8, a light guide plate 801 is fitted at the front face of a frame 804, with light sources 802 arranged at end faces of light guide plate 801. In this case, light guide plate 801 describes an arc in the transverse direction. A bulletin board can thus be provided of improved recognisability and offering excellent possibilities from the point of view of design.

Light guide plate 801 possesses the function of transmitting, with scarcely any dispersion, light rays that are directed on to bulletin board 803 and reflected by bulletin board 803. When there is sufficient external light, this is employed with light source 802 extinguished; in this case, light guide plate 801 acts simply as a transparent plate, and is effective in that recognisability is not reduced. Also, when it is used with the illumination turned on, as in dark locations where there is insufficient external light, light guide plate 801 illuminates bulletin board 803, yet, in respect of the reflected light, light guide plate 801 functions simply as a transparent plate just as in the case where it was used with the illumination turned off as described above, with the result that the reflected light is transmitted therethrough unaltered. This is therefore beneficial for maintaining high recognisability.

(Sixth Embodiment)

Figure 9A:
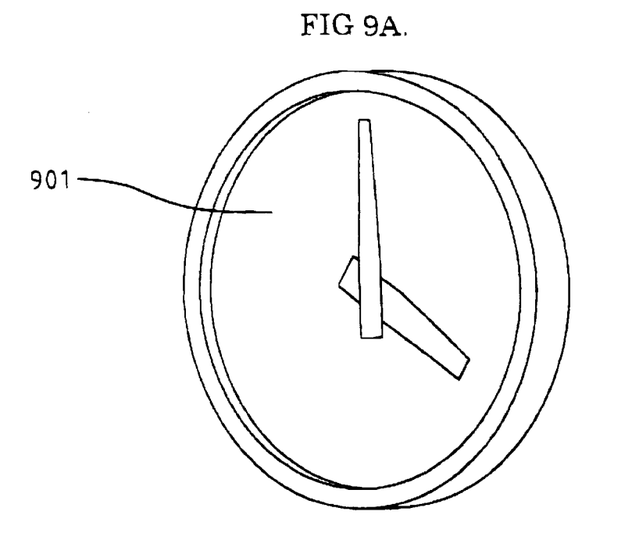
FIGS. 9A and 9B is a diagram showing an embodiment of a timepiece according to the present invention.
Figure 9B:
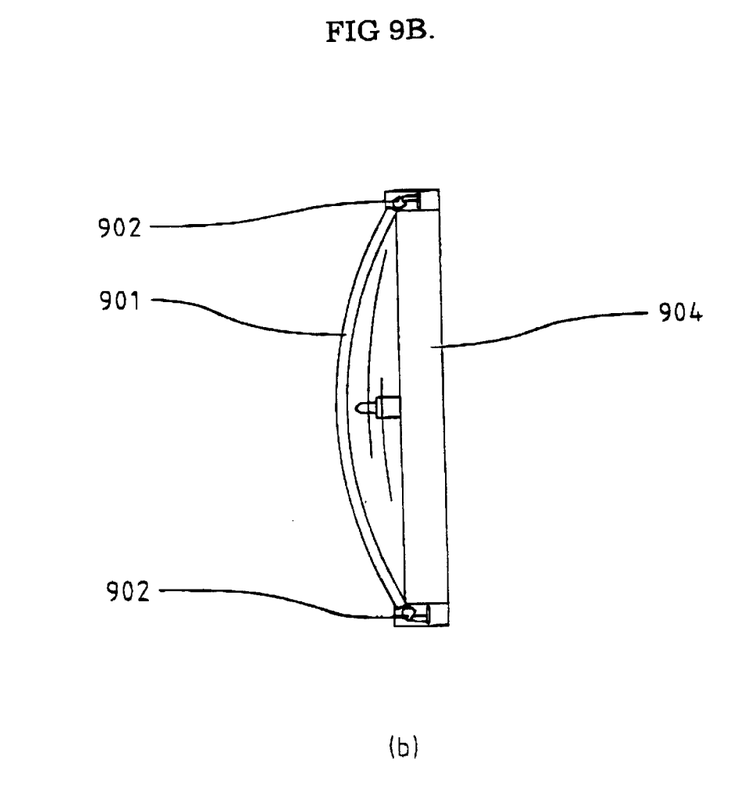

An embodiment of the present invention applied to a timepiece will now be described with reference to the drawings. FIG. 9A shows a perspective view and FIG. 9B shows a cross-section. In FIGS. 9A and 9B a light guide plate 901 is fitted at the front face of timepiece 904, and a light source 902 is arranged at the end face of light guide plate 901. In this case, light guide plate 901 is of spherical shape, describing an arc and improves the recognisability of the timepiece. In addition, it offers the possibility of achieving an excellent product in terms of design.

(Seventh Embodiment)

Figure 10:
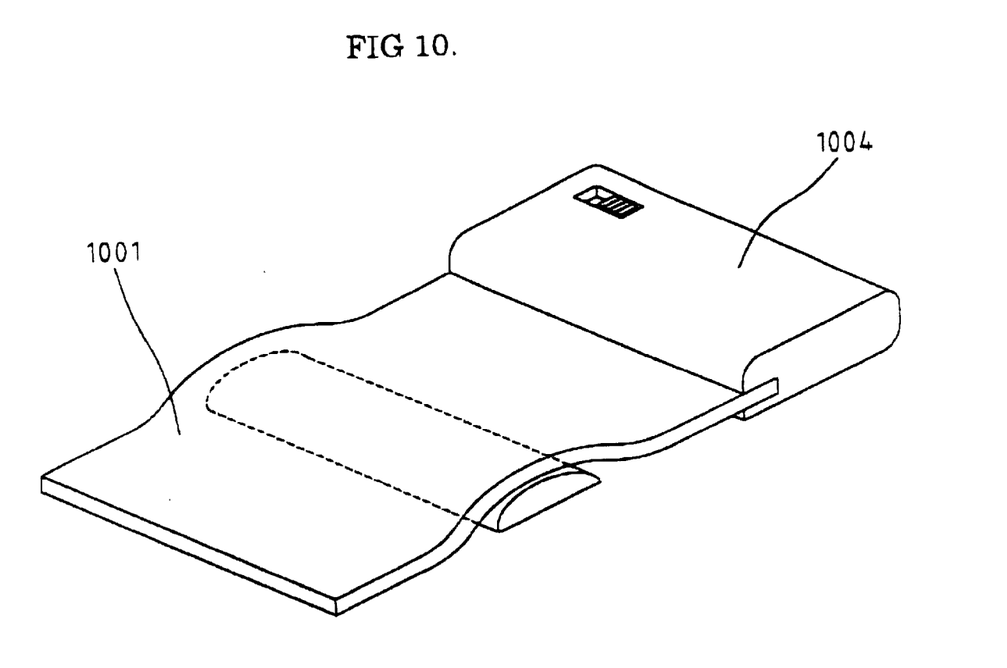
FIG. 10 is a perspective view showing an embodiment of a portable illumination device according to the present invention.

An embodiment of a portable illumination device according to the present invention is described below with reference to the drawings. In FIG. 10, this portable illumination device is constituted of a light guide plate 1001 formed by flexible transparent material and a light source device 1004 arranged at an end face of this light guide plate. Since light guide plate 1001 is flexible, the light guide plate can bend along a curved surface of a three-dimensional object or for example when a book or publication is opened, so enabling efficient and easy-to-view illumination to be achieved.

(Eighth Embodiment)

Figure 11:
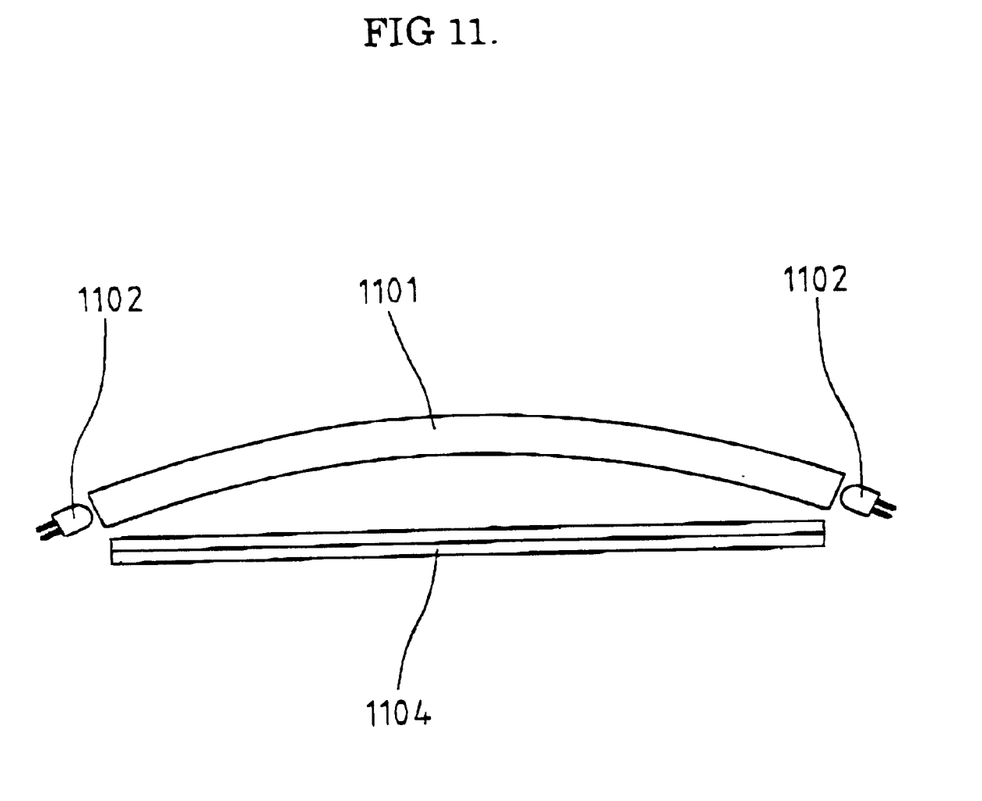
FIG. 11 is a cross-sectional view showing an embodiment of a display device according to the present invention.

An embodiment of a display device according to the present invention Is described below with reference to the drawings. In FIG. 11, a light guide plate 1101 is arranged at the front face of display 1104, and light sources 1102 are arranged at the end faces of light guide plate 1101. In this case, light guide plate 1101 describes an arc, and confers the possibility of providing products that are excellent in design terms.

(Ninth Embodiment)

Figure 12:
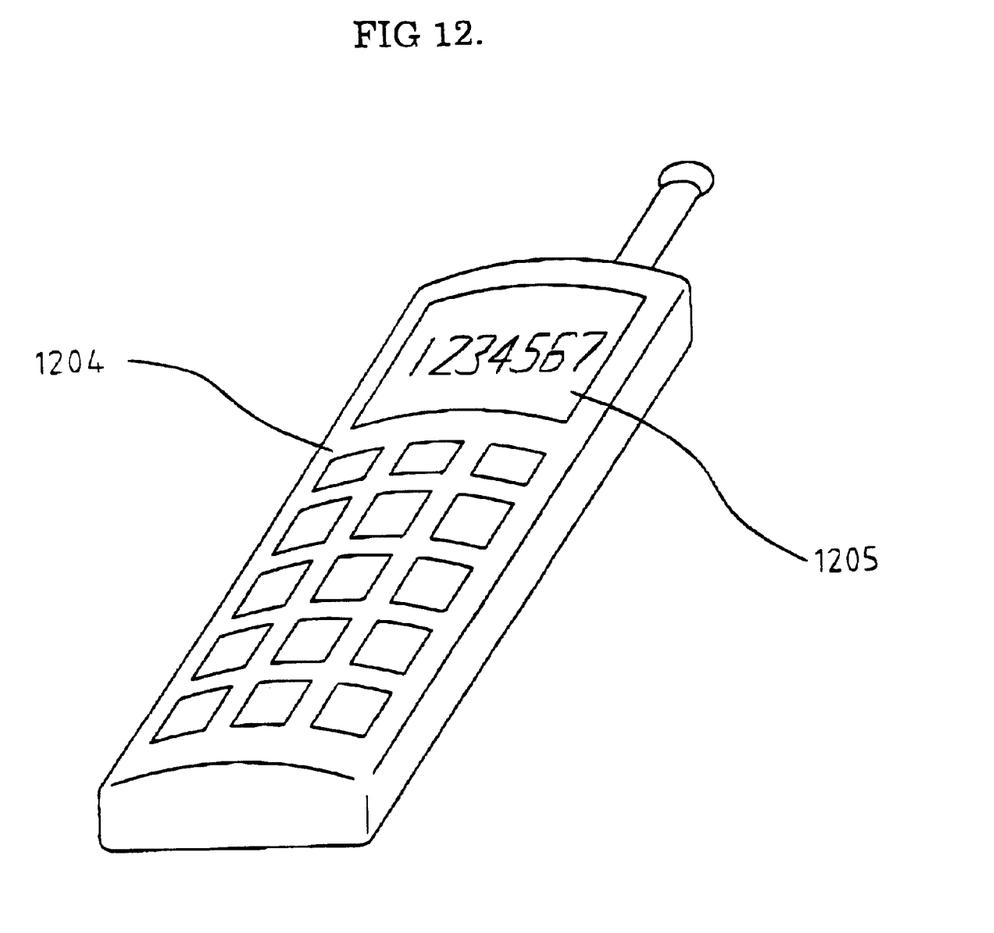
FIG. 12 is a perspective view showing an embodiment of a mobile telephone device according to the present invention.

An embodiment of a mobile telephone device and electronic equipment according to the present invention is described below with reference to the drawings. In FIG. 12, a display 105 is fitted at the front face of electronic equipment constituted by a mobile telephone device 1204. In this case, the front face of display 1205 describes an arc and confers the possibility of obtaining products that are excellent in terms of design.

With the present invention, as described above, thin-sheet illumination can be provided whereby a curved surface can be formed matching a target object that is suited for bulletin boards utilising external light and/or for illumination of three-dimensional objects.

Also, a bulletin board device can be provided that is of high recognisability and excellent In terms of design.

What is claimed is:

1. An illumination device arranged at the front face of an object to be illuminated, comprising:

a light guide plate including optical diffusion shapes on at least one plate face of a transparent plate, said plate having a continuously curved surface adjacent to the object to be illuminated; and a light source arranged adjacent to an end face of the light guide plate.

2. The illumination device according to claim 1 wherein, in a cross-section produced by a plane containing part of said light source of said light guide plate, said light guide plate having an approximately fixed thickness of t, if θ is the angle with respect to the tangential plane of this plate surface of said light guide plate at said end face of incident light from said end face adjacent which said light source is arranged, n1 is the refractive index of said light guide plate, n2 is the refractive index of the medium contacting this plate face of said light guide plate, and r is the radius of curvature on the side of said light guide plate of smallest plate face, the condition $$t/r \leq (n1/n2) \times \cos \theta - 1$$

is satisfied.

3. The illumination device according to claim 1, wherein the end face at which at least said light source is arranged adjacently is approximately perpendicular with respect to the tangential plane of the plate face of said light guide plate, said light guide plate has an approximately fixed thickness of t, and, in a cross-section based on the plane containing part of said light source of said light guide plate, if the refractive index of said light guide plate is n1, the refractive index of the medium contacting the plate face of said light guide plate is n2, and the refractive index of the medium contacting said end face where the light source of said light guide plate is arranged is n3 and the radius of curvature of the smaller plate face of said light guide plate is r, the condition $$t/r \leq (n2 - n3^2)^{1/2}/n2 - 1$$

is satisfied.

4. An illumination device arranged at the front face of an object to be illuminated, comprising:

a light guide plate formed with optical diffusion shapes on at least one plate face of a transparent plate formed of flexible transparent material; and a light source arranged adjacent an end face of this light guide plate.

5. The illumination device according to claim 1, wherein a transparent film is arranged adjacent at least one plate face of said light guide plate, with interposition of an air layer.

6. The illumination device according to claim 1, wherein said optical diffusion shapes are projecting shapes provided on the side of said light guide plate nearest the object to be illuminated.

7. The illumination device according to claim 6, wherein said projecting shapes are constituted of side faces approximately perpendicular with respect to the tangential plane of the plate face of said light guide plate and bottom faces approximately parallel thereto.

8. The illumination device according to claim 6, wherein said projecting shapes are cylindrical pillar shapes.

9. The illumination device according to claim 1, wherein said optical diffusion shapes are convex shapes provided on the face of said light guide plate on the opposite side with respect to the object to be illuminated.

10. The illumination device according to claim 1, wherein said optical diffusion shapes are concave shapes provided on the face of said light guide plate on the opposite side with respect to the object to be illuminated.

11. A bulletin board device employing the illumination device according to claim 1.

12. A timepiece employing the illumination device according to claim 1.

13. A portable illumination device employing the illumination device according to claim 1.

14. A display device employing the illumination device according to claim 1.

15. Electronic equipment employing the display device according to claim 14.

16. A mobile telephone device employing the display device according to claim 14.

17. The illumination device according to claim 4, wherein a transparent film is arranged adjacent at least one plate face of said light guide plate, with interposition of an air layer.

18. The illumination device according to claim 4, wherein said optical diffusion shapes are projecting shapes provided on the side of said light guide plate nearest the object to be illuminated.

19. The illumination device according to claim 4, wherein said projecting shapes are constituted of side faces approximately perpendicular with respect to the tangential plane of the plate face of said light guide plate and bottom faces approximately parallel thereto.

20. The illumination device according to claim 4, wherein said projecting shapes are cylindrical pillar shapes.

21. The illumination device according to claim 4, wherein said optical diffusion shapes are convex shapes provided on the face of said light guide plate on the opposite side with respect to the object to be illuminated.

22. The illumination device according to claim 4, wherein said optical diffusion shapes are concave shapes provided on the face of said light guide plate on the opposite side with respect to the object to be illuminated.

23. A bulletin board device employing the illumination device according to claim 4.

24. A timepiece employing the illumination device according to claim 4.

25. A portable illumination device employing the illumination device according to claim 4.

26. A display device employing the illumination device according to claim 4.

27. Electronic equipment employing the display device according to claim 4.

28. A mobile telephone device employing the display device according to claim 4.

* * * * *